US009352712B2

(12) United States Patent
Zhou et al.

(10) Patent No.: US 9,352,712 B2
(45) Date of Patent: May 31, 2016

(54) CAR AND BUMPER ASSEMBLY OF CAR

(71) Applicants: Fu Tai Hua Industry (Shenzhen) Co., Ltd., Shenzhen (CN); HON HAI PRECISION INDUSTRY CO., LTD., New Taipei (TW)

(72) Inventors: Xiao-Gang Zhou, Shenzhen (CN); Wei-Min Yang, Shenzhen (CN)

(73) Assignees: Fu Tai Hua Industry (Shenzhen) Co., Ltd., Shenzhen (CN); HON HAI PRECISION INDUSTRY CO., LTD., New Taipei (TW)

( * ) Notice: Subject to any disclaimer, the term of this patent is extended or adjusted under 35 U.S.C. 154(b) by 0 days.

(21) Appl. No.: 14/578,933

(22) Filed: Dec. 22, 2014

(65) Prior Publication Data

US 2015/0183388 A1    Jul. 2, 2015

(30) Foreign Application Priority Data

Dec. 27, 2013  (CN) .......................... 2013 1 0733197

(51) Int. Cl.
  *B60R 19/32* (2006.01)
  *B60R 19/26* (2006.01)
(52) U.S. Cl.
  CPC ................. *B60R 19/32* (2013.01); *B60R 19/26* (2013.01)
(58) Field of Classification Search
  CPC .......... B60R 19/32; B60R 19/26; B60R 3/02; B60R 9/048; B60R 9/10
  USPC ........... 293/134, 135, 25, 117, 2, 4, 137, 102, 293/24, 26, 126, 131
  See application file for complete search history.

(56) References Cited

U.S. PATENT DOCUMENTS

| | | | | |
|---|---|---|---|---|
| 3,075,490 A | * | 1/1963 | Lang ...................... | B63H 20/06 114/279 |
| 3,433,520 A | * | 3/1969 | Steinmetz et al. ............ | 293/137 |
| 3,857,595 A | * | 12/1974 | Plegat ........................... | 293/137 |
| 3,990,660 A | * | 11/1976 | Pipoz ....................... | F16M 1/02 248/642 |
| 4,627,493 A | * | 12/1986 | Alameddine .................. | 166/263 |
| 4,765,026 A | * | 8/1988 | Dochnahl ........... | E05D 13/1238 16/289 |
| 4,807,915 A | * | 2/1989 | Shyi ............................. | 293/132 |
| 5,711,514 A | * | 1/1998 | Lu ........................... | F16F 9/435 188/322.15 |
| 6,217,090 B1 | * | 4/2001 | Berzinji .................. | B60R 19/28 293/106 |
| 6,739,635 B2 | * | 5/2004 | Byun ........................... | 293/135 |
| 6,991,991 B2 | * | 1/2006 | Cheng ............... | H01L 21/02052 257/E21.228 |
| 7,766,403 B2 | * | 8/2010 | Alvarsson et al. ............ | 293/133 |
| 2005/0012256 A1 | * | 1/2005 | Huprikar .............. | B60G 13/003 267/141 |

* cited by examiner

*Primary Examiner* — Glenn Dayoan
*Assistant Examiner* — Sunsurraye Westbrook
(74) *Attorney, Agent, or Firm* — Novak Druce Connolly Bove + Quigg LLP

(57) ABSTRACT

A bumper assembly for a car includes a bumper and at least two buffering assemblies inclined to each other. Each buffering assembly includes an elastic member, a pivoting member, and a coupling rod. The pivoting member is coupled to a first end portion of the elastic member. The pivoting member is configured to pivot to the car. The coupling rod is coupled to a second end portion of the elastic member. An end portion of the coupling rod away from the elastic member is pivoted to the bumper.

16 Claims, 2 Drawing Sheets

CAR AND BUMPER ASSEMBLY OF CAR

FIELD

The subject matter herein generally relates to cars, and particularly to a car having a bumper assembly.

BACKGROUND

Cars are popular nowadays. Safety of the car is important. When a force is applied to a car, a bumper assembly can be used to protect the car.

BRIEF DESCRIPTION OF THE DRAWINGS

Implementations of the present technology will now be described, by way of example only, with reference to the attached figures.

DETAILED DESCRIPTION

Figure 1:
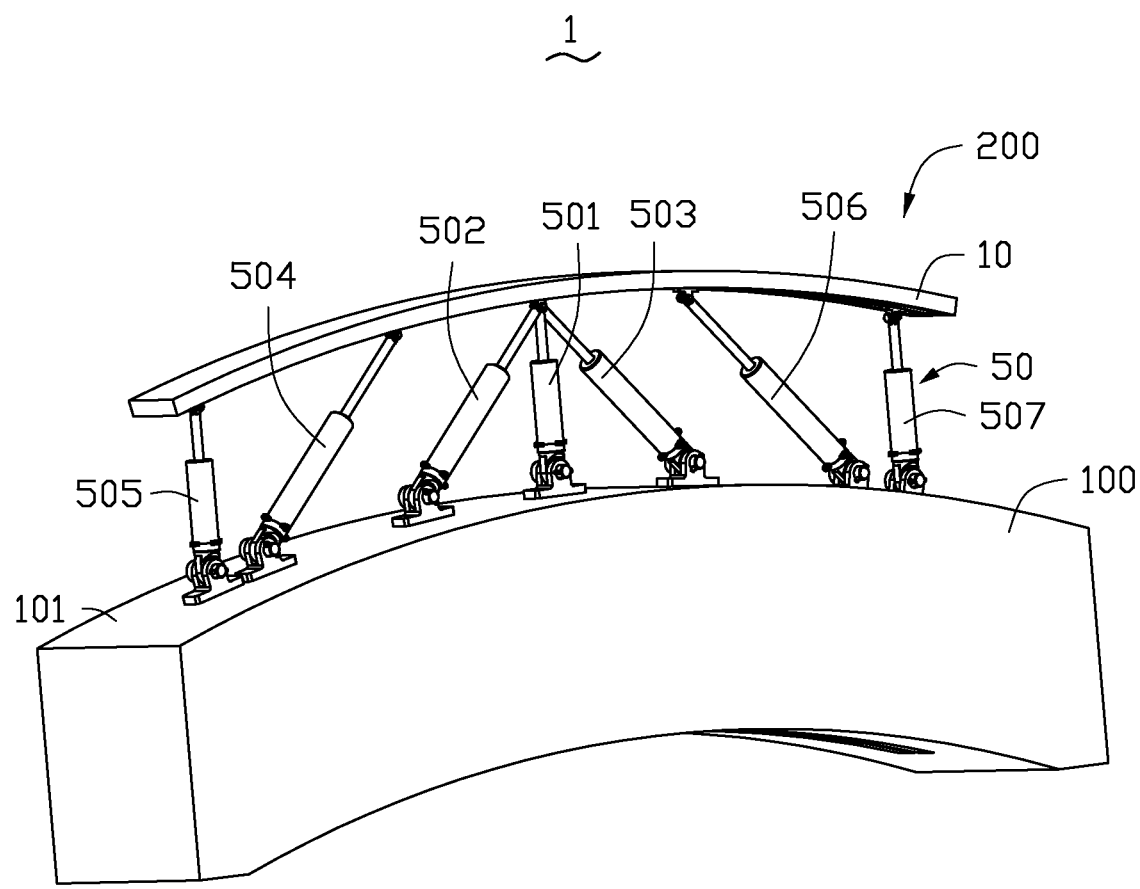
FIG. 1 is a partial, isometric view of an embodiment of a car including a bumper assembly, the bumper assembly including a buffering assembly.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts may be exaggerated to better illustrate details and features of the present disclosure.

Several definitions that apply throughout this disclosure will now be presented.

The term "coupled" is defined as connected, whether directly or indirectly through intervening components, and is not necessarily limited to physical connections. The connection can be such that the objects are permanently connected or releasably connected. The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising," when utilized, means "including, but not necessarily limited to"; it specifically indicates open-ended inclusion or membership in the so-described combination, group, series and the like.

The present disclosure is in relation to a bumper assembly for a car which can include a bumper configured to be coupled to the car and at least two buffering assemblies coupled to the bumper and inclined to each other. Each buffering assembly can include an elastic member, a pivoting member, and a coupling rod. The elastic member can have a first end portion and a second end portion opposite the first end portion. The pivoting member can be coupled to the first end portion and configured to pivot towards the car. The coupling rod can be coupled to the second end portion at a first end of the coupling rod and coupled to the bumper at a second end opposite the first end.

The present disclosure is in relation to a car which can include a car body and a bumper assembly. The bumper assembly can include a bumper configured to be coupled to the car body and at least two buffering assemblies coupled to the bumper and inclined to each other. Each buffering assembly can include an elastic member, a pivoting member, and a coupling rod. The elastic member can have a first end portion and a second end portion opposite the first end portion. The pivoting member can be coupled to the first end portion and configured to pivot towards the car body. The coupling rod can be coupled to the second end portion at a first end of the coupling rod and coupled to the bumper at a second end opposite the first end.

FIG. 1 illustrates an embodiment of a car 1 (partly shown in FIG. 1). The car 1 can include a car body 100 (partly shown in FIG. 1) and a bumper assembly 200 coupled to the car body 100. The car 1 can include other structures. In sake of simplify, introductions of the other structures are omitted.

The bumper assembly 200 can include a bumper 10 and a plurality of buffering assemblies 50. The plurality of buffering assemblies 50 can be positioned between the car body 100 and the bumper 10. The bumper 10 can be substantially arc-shaped. The car body 100 can have a front surface 101. The front surface 101 can be substantially arc-shaped, and can have a same radian with the bumper 10.

Figure 2:
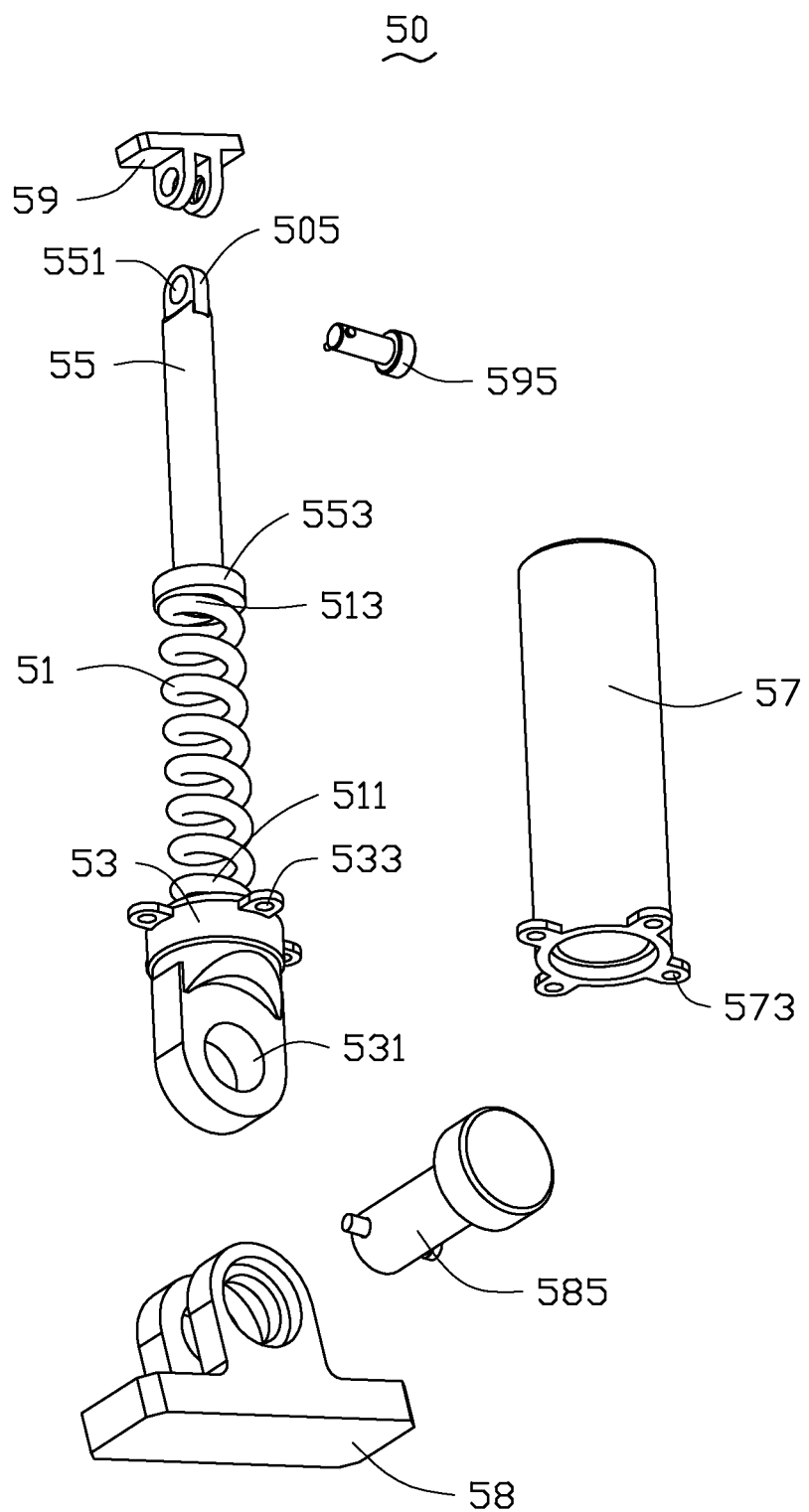
FIG. 2 is an exploded, isometric view of the buffering assembly of FIG. 1.

FIG. 2 shows that each buffering assembly 50 can include an elastic member 51, a pivoting member 53, a coupling rod 55, a sleeve 57, a first coupling member 58, a first pivoting shaft 585, a second coupling member 59, and a second pivoting shaft 595. The elastic member 51 can have a first end portion 511 and a second end portion 513 opposite the first end portion 511. The pivoting member 53 can be coupled to the first end portion 511 and configured to pivot towards the car body 100. The coupling rod 55 can have a first end 553 and a second end 555 opposite the first end 553. The pivoting member 53 can be fixedly coupled to a first end portion 511 of the elastic member 51. The first end 553 of the coupling rod 55 can be fixedly coupled to a second end portion 513 of the elastic member 51. The second end 555 of the coupling rod 55 can be coupled to the bumper 10.

A first pivoting hole 531 can be defined at a first end portion of the pivoting member 53 away from the elastic member 51. Four first protruding portions 533 can protrude outward from a second end portion of the pivoting member 53 adjacent to the elastic member 51. The elastic member 51, the pivoting member 53, and the coupling member 55 can be arranged in a substantially straight line.

A second pivoting hole 551 can be defined at the second end 555 of the coupling rod 55. The sleeve 57 can be sleeved on the elastic member 51. Four second protruding portions 573 can protrude outward from an end portion of the sleeve 57. The second protruding portions 573 can be positioned adjacent to the first protruding portions 533 and fixed to the first protruding portions 533, respectively.

The first pivoting shaft 585 can be movably inserted through the first coupling member 58 and the first pivoting hole 531 of the pivoting member 53, to enable the first coupling member 58 being pivoted to the pivoting member 53. Thus, the pivoting member 53 can rotate about a center axis of the first pivoting hole 531. The second pivoting shaft 595 can be movably inserted through the second coupling member 59 and the second pivoting hole 551 of the coupling rod 55, to enable the coupling rod 55 being pivoted to the second coupling member 59. Thus, the coupling rod 55 can rotate about a center axis of the second pivoting hole 551. The first coupling member 58 of each buffering assembly 50 can be fixedly coupled to the front surface of the car body 100. The second coupling member 59 of each coupling member 59 can be fixedly coupled to the bumper 10.

Referring to FIG. 1 again, in the illustrated embodiment, a number of the buffering assembly 50 can be seven. The seven buffering assemblies 50 can be a first buffering assembly 501, a second buffering assembly 502, a third buffering assembly 503, a fourth buffering assembly 504, a fifth buffering assembly 505, a sixth buffering assembly 506, and a seventh buffering assembly 507.

In the illustrated embodiment, the coupling rod 55 of the first buffering assembly 501, the coupling rod 55 of the second buffering assembly 502, and the coupling rod 55 of the third buffering assembly 503 can be coupled to a same second coupling member 59 via a same second pivoting shaft 595. Opposite ends of the first buffering assembly 501 can be coupled to a substantially center portion of the bumper 10 and a substantially center portion of the car body 100. The first buffering assembly 501 can be arranged along a normal line of the bumper 10. The second buffering assembly 502 and the third buffering assembly 503 can be respectively inclined to the first buffering assembly 501, and symmetrically positioned at opposite sides of the first buffering assembly 501. An included angle between the first buffering assembly 501 and the second buffering assembly 502 can substantially equal to an included angle between the first buffering assembly 501 and the third buffering assembly 503.

The fourth buffering assembly 504 and the fifth buffering assembly 505 can be positioned at a side of the second buffering assembly 502 away from the first buffering assembly 501 (left side of the second buffering assembly view from FIG. 1). The fourth buffering assembly 504 can be positioned closer to the second buffering assembly 502 than the fifth buffering assembly 505. The sixth buffering assembly 506 and the seventh buffering assembly 507 can be positioned at a side of the third buffering assembly 503 away from the first buffering assembly 501 (right side of the third buffering assembly view from FIG. 1). The sixth buffering assembly 506 can be positioned closer to the third buffering assembly 503 than the seventh buffering assembly 507.

The fourth buffering assembly 504 and the second buffering assembly 502 can be substantially parallel to each other. The sixth buffering assembly 506 and the third buffering assembly 503 can be substantially parallel to each other. The first buffering assembly 501, the fifth buffering assembly 505, and the seventh buffering assembly 507 can be substantially parallel to each other. In the illustrated embodiment, the seven buffering assemblies 50 can be arranged in a horizontal plane. The first pivoting shafts 585 of the seven buffering assemblies 50 and the second pivoting shafts 595 of the seven buffering assemblies 50 can be both substantially perpendicular to the horizontal plane, and positioned vertically.

When a force is applied to the bumper 10, an angle between each buffering assembly 50 and the car body 100 or an angle between each buffering assembly 50 and the bumper 10 can be adjusted. Thus, the buffering assemblies 50 can be not easily to be broken off.

In at least one embodiment, a number of the buffering assembly 50 can be not limited to the illustrated embodiment. The first coupling member 58 and the second coupling member 59 can be omitted. Thus, the pivoting member 53 can be directly pivoted to the car body 100. The coupling rod 55 can be directly pivoted to the bumper 10.

The embodiments shown and described above are only examples. Many details are often found in the art such as the other features of a car and a bumper assembly. Therefore, many such details are neither shown nor described. Even though numerous characteristics and advantages of the present technology have been set forth in the foregoing description, together with details of the structure and function of the present disclosure, the disclosure is illustrative only, and changes may be made in the details, including in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A bumper assembly for a car comprising:
   a bumper configured to be coupled to the car; and
   at least two buffering assemblies coupled to the bumper and inclined to each other, each buffering assembly comprising:
      an elastic member having a first end portion and a second end portion opposite the first end portion,
      a pivoting member coupled to the first end portion
      a coupling rod coupled to the second end portion at a first end of the coupling rod and coupled to the bumper at a second end opposite the first end; and
      a first coupling member and a first pivoting shaft, the first coupling member being configured to couple the car, and the pivoting member being pivotally fixed to the first coupling member by the first pivoting shaft.

2. The bumper assembly of claim 1, wherein each buffering assembly further comprise a sleeve sleeved on the elastic member, an end of the sleeve away from the coupling rod is coupled to the pivoting member.

3. The bumper assembly of claim 1, wherein each buffering assembly further comprises a second coupling member and a second pivoting shaft, the second pivoting member is coupled to the bumper, the second pivoting shaft pivots the coupling rod to the second coupling member.

4. The bumper assembly of claim 3, wherein the at least two buffering assemblies comprising:
   a first buffering assembly, opposite ends of the first buffering assembly is configured to couple a substantially center portion of the bumper and a substantially center portion of the car, the first buffering assembly is arranged along a normal line of the bumper;
   a second buffering assembly; and
   a third buffering assembly, the second buffering assembly and the third buffering assembly are respectively inclined with the first buffering assembly, and symmetrically positioned at opposite sides of the first buffering assembly.

5. The bumper assembly of claim 4, wherein the at least two buffering assemblies further comprising:
   a fourth buffering assembly; and
   a fifth buffering assembly, the fourth buffering assembly and the fifth buffering assembly are positioned at a side of the second buffering assembly away from the first buffering assembly, the fourth buffering assembly is positioned closer to the second buffering assembly than the fifth buffering assembly, the fourth buffering assembly and the second buffering assembly are substantially parallel to each other.

6. The bumper assembly of claim 5, wherein the at least two buffering assemblies further comprising:
   a sixth buffering assembly; and
   a seventh buffering assembly, the sixth buffering assembly and the seventh buffering assembly are positioned at a side of the third buffering assembly away from the first buffering assembly, the sixth buffering assembly is positioned closer to the third buffering assembly than the seventh buffering assembly, the sixth buffering assembly and the third buffering assembly are substantially parallel to each other.

7. The bumper assembly of claim 3, wherein the at least two buffering assemblies are arranged in a horizontal plane, the first pivoting shafts of the at least two buffering assemblies and the second pivoting shafts of the at least two buffering assemblies are both substantially perpendicular to the horizontal plane, and the first pivoting shafts are substantially perpendicular to the second pivoting shafts.

8. A car comprising:
a car body, and
a bumper assembly comprising:
  a bumper configured to be coupled to the car body; and
  at least two buffering assemblies coupled to the bumper and inclined to each other, each buffering assembly comprising:
    an elastic member having a first end portion and a second end portion opposite the first end portion,
    a pivoting member coupled to the first end portion, and
    a coupling rod coupled to the second end portion at a first end of the coupling rod and coupled to the bumper at a second end opposite the first end; and
  a first coupling member and a first pivoting shaft, the first coupling member being configured to couple the car, and the pivoting member being pivotally fixed to the first coupling member by the first pivoting shaft.

9. The car of claim 8, wherein each buffering assembly further comprise a sleeve sleeved on the elastic member, an end of the sleeve away from the coupling rod is coupled to the pivoting member.

10. The car of claim 9, wherein four first protruding portions protrude outward from the pivoting member, four second protruding portions protrude outward from an end portion of the sleeve, the second protruding portions are positioned adjacent to the first protruding portions and fixed to the first protruding portions, respectively.

11. The car of claim 8, wherein each buffering assembly further comprises a second coupling member and a second pivoting shaft, the second pivoting member is coupled to the bumper, the second pivoting shaft pivots the coupling rod to the second coupling member.

12. The car of claim 11, wherein the at least two buffering assemblies comprising:
a first buffering assembly, opposite ends of the first buffering assembly is coupled to a substantially center portion of the bumper and a substantially center portion of the car body, the first buffering assembly is arranged along a normal line of the bumper;
a second buffering assembly; and
a third buffering assembly, the second buffering assembly and the third buffering assembly are respectively inclined with the first buffering assembly, and symmetrically positioned at opposite sides of the first buffering assembly.

13. The car of claim 12, wherein the at least two buffering assemblies further comprising:
a fourth buffering assembly; and
a fifth buffering assembly, the fourth buffering assembly and the fifth buffering assembly are positioned at a side of the second buffering assembly away from the first buffering assembly, the fourth buffering assembly is positioned closer to the second buffering assembly than the fifth buffering assembly, the fourth buffering assembly and the second buffering assembly are substantially parallel to each other.

14. The car of claim 13, wherein the at least two buffering assemblies further comprising:
a sixth buffering assembly; and
a seventh buffering assembly, the sixth buffering assembly and the seventh buffering assembly are positioned at a side of the third buffering assembly away from the first buffering assembly, the sixth buffering assembly is positioned closer to the third buffering assembly than the seventh buffering assembly, the sixth buffering assembly and the third buffering assembly are substantially parallel to each other.

15. The car of claim 11, wherein the at least two buffering assemblies are arranged in a horizontal plane, the first pivoting shafts of the at least two buffering assemblies and the second pivoting shafts of the at least two buffering assemblies are both substantially perpendicular to the horizontal plane, and the first pivoting shafts are substantially perpendicular to the second pivoting shafts.

16. The car of claim 8, wherein the bumper is substantially arc-shaped, the car body has a front surface, the front surface is substantially arc-shaped, and has a same radian with the bumper.

\* \* \* \* \*